United States Patent [19]

Hope et al.

[11] 4,171,940
[45] Oct. 23, 1979

[54] LEADERLESS FILM PROCESSING APPARATUS

[76] Inventors: Henry F. Hope, 3192 Huntingdon Rd, Huntingdon Valley, Pa. 19006; Stephen F. Hope, 2548 Wyandotte Rd., Willow Grove, Pa. 19090

[21] Appl. No.: 756,556

[22] Filed: Jan. 3, 1977

Related U.S. Application Data

[60] Continuation-in-part of Ser. No. 692,196, Jun. 2, 1976, which is a division of Ser. No. 530,685, Dec. 9, 1974, Pat. No. 3,966,868.

[51] Int. Cl.$^2$ .............................................. B29C 3/00
[52] U.S. Cl. ....................................... 425/3; 425/384; 425/158; 425/156
[58] Field of Search ................... 425/3, 383, 158, 406, 425/385, 407, 396, 156, 384; 100/210, 211

[56] References Cited

U.S. PATENT DOCUMENTS

| | | | |
|---|---|---|---|
| 3,178,792 | 4/1965 | Scott | 425/407 X |
| 3,548,043 | 12/1970 | Held, Jr. | 425/158 X |
| 3,887,312 | 6/1975 | Seang | 425/3 |
| 4,038,011 | 7/1977 | Lemelson | 425/396 |

*Primary Examiner*—Robert L. Spicer, Jr.
*Attorney, Agent, or Firm*—Weiser, Stapler & Spivak

[57] ABSTRACT

Strips of photographic film are processed through a film developing machine which transports the film by means of rollers. Curling of the film around the rollers of the machine is avoided even though no separate leader is attached to the film.

This is accomplished by first inserting one end of the film strip into a device which has an open slot defined by a pair of platens which face each other. At least one platen is heated and at least one platen has corrugations in its slot-defining surface. Provisions are made for responding to insertion of the strip into the slot to close the platens upon the inserted strip, and maintaining these platens so closed for a length of time sufficient to impress the platen corrugations into the film. The slot is then reopened, the strip is withdrawn, and inserted into the nip of the input rollers to the developing machine.

Specific embodiments of the corrugating device are also taught.

21 Claims, 16 Drawing Figures

LEADERLESS FILM PROCESSING APPARATUS

RELATED CASES

This application is a Continuation-in-Part of copending application Ser. No. 692,196, filed June 2, 1976, which in turn is a division of application Ser. No. 530,685, filed on Dec. 9, 1974, now U.S. Pat. No. 3,966,868 issued June 29, 1976.

BACKGROUND OF THE INVENTION

The present invention relates generally to the field of processing photographic films and, more particularly, to the processing of such films through automatic developing machinery.

As explained in the above-identified prior copending application and issued patent, there are problems in such film processing, attributable to the tendency of the film to curl. This causes the film to hang up on, or wrap around the rollers, or roller-like members which are typically used in such developing machines to transport the film through the machine. This interrupts the passage of the film through the machine, causing such serious problems as jam-ups, machine down-time and damage to the films.

The widely used technique for dealing with these problems involved attaching a separate, straight "leader" to the leading end of the film itself. This separate leader was relied on to guide the film through the developing machine without encountering the difficulties stemming from the film's own curl. However, this technique suffered from serious disadvantages of its own, which are also detailed in the above-mentioned copending application and issued patent.

The leader attaching and detaching operations are time-consuming and burdensome, the leaders can become unintentionally detached inside the machine, the joint between leader and film is a source of trouble, and so forth.

To overcome all of these problems—at one stroke—the above-identified copending application and issued patent teach the use of a novel technique which dispenses with the leader and yet retains all of its desirable attributes in terms of overcoming the ill effects of film curl.

This novel technique involves imparting physical deformations to that end portion of the film which is to lead the film through the developing machine. These deformations are of such a character that this end portion no longer has a tendency to curl, but rather is straight and has a tendency to remain straight even while the film passes through the developing machine. By so doing, there are overcome the problems of curl but without introducing the problems caused by separate leaders.

Also, stickers with identifying numerals sometimes referred to as "twin check" labels can be firmly affixed to the film while it is being deformed.

SUMMARY OF THE INVENTION

The present invention relates to specific embodiments and applications of the novel technique which has been briefly described above, and which is the subject of the above-identified copending patent application and issued patent.

In particular it is an object of the present invention to provide further specific embodiments of a technique for processing photographic film through film developing machinery, without using a separate leader for the film.

It is another object to provide such further embodiments in which the film is treated in a very simple and yet effective manner for the purpose stated above.

It is still another object to provide such embodiments in which advantageous use is made of heating effects.

It is still another object to provide such embodiments in which heating of the film, in conjunction with mechanical pressure exerted on the film, is advantageously relied upon.

These and other objects which will appear are achieved in accordance with the present invention by utilizing a corrugating device having a pair of platens facing each other, one or both of which have corrugations in their faces, and one or both of which are heated to a temperature at which the film to be processed becomes capable of being deformed to assume the shape of the platen corrugations. The platens are spaced to define an open slot between them. The leading end of the film strip is inserted into that open slot. The device responds to this insertion of the strip into the slot to close the platens upon the inserted strip, and to maintain the platens closed upon the strip, thereby maintaining the strip stationary between the closed platens, for a predetermined period of time sufficient to impress into the strip corrugations conforming to those in the platen surface. The device has provisions for reopening the slot at the end of the period. The strip is then withdrawn from the reopened slot, and the same film strip end is inserted into the nip of the input rollers for the film developing machine.

Specific embodiments of the corrugating device utilize mechanically powered means (e.g. springs) for continuously urging the slot-defining pressure platens toward each other, electrically powered means (e.g. a solenoid) for overcoming during a limited period the urging-together of the mechanically powered means, thereby separating the platens and forming between them the slot for the insertion of the strip end portion to be corrugated, and further mechanically powered means (e.g. a latching lever) for maintaining the platens separated after the end of said limited period. The device further has provisions for sensing the insertion of the strip into the slot, and for disabling the means which maintains the platens separated, thereby allowing the platens to close upon the inserted strip, which thereby becomes corrugated. A timing means delays by a predetermined time interval the reseparating of the platens by the electrically powered means.

Stickers containing identifying numerals applied to the end of the film also become firmly adhered to the film by combined pressure and heat of the corrugating device.

BRIEF DESCRIPTION OF THE DRAWINGS

FIG. 2 is an exploded, perspective view of the film corrugating device of FIG. 1a.

The same reference numerals are used in the various figures to denote similar elements.

DESCRIPTION OF THE PREFERRED EMBODIMENTS OF THE INVENTION

Figure 1A:
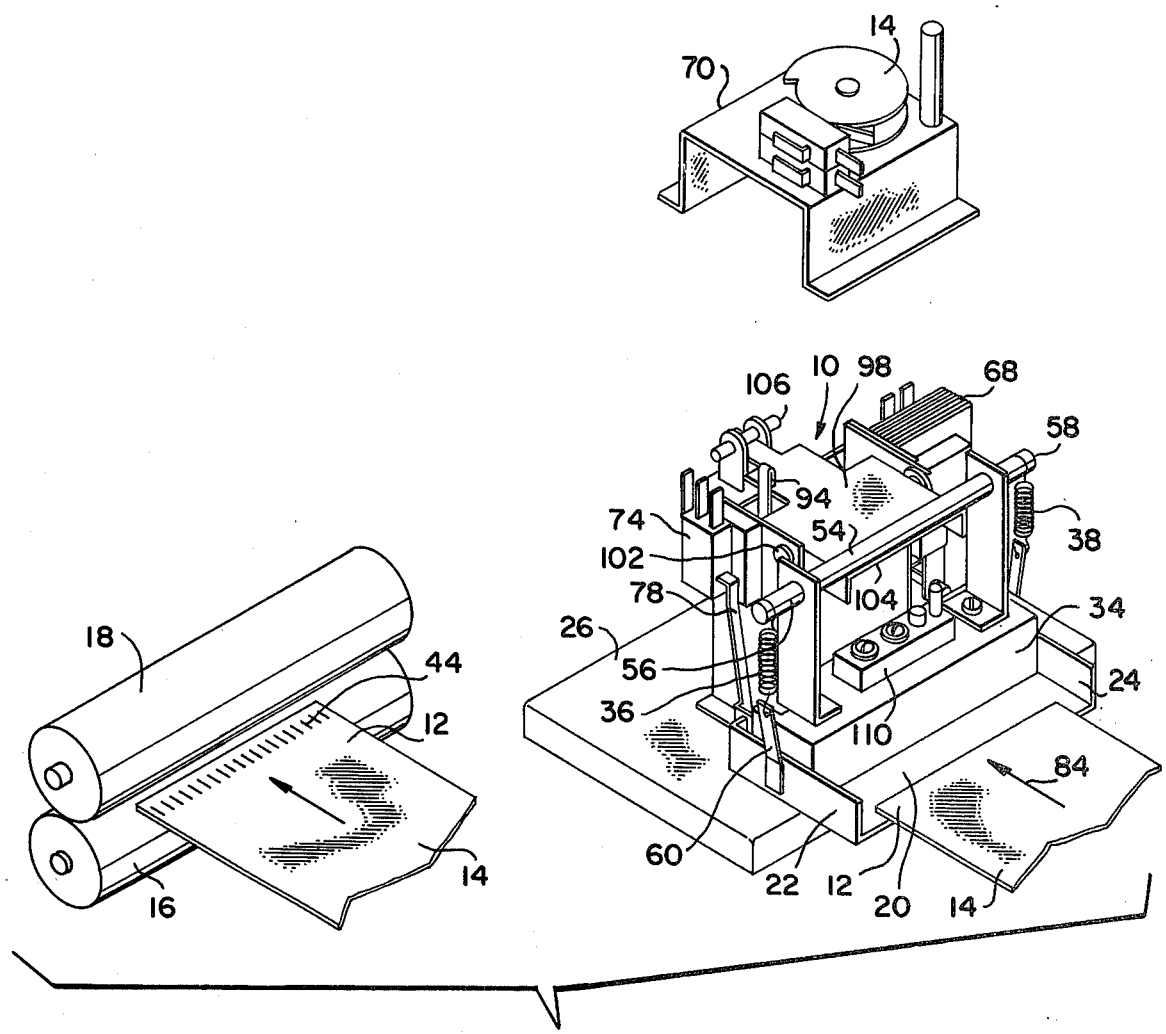
FIG. 1a is an enlarged view of a portion of the machine of FIG. 1, showing certain internal construction features of the machine input and of one specific embodiment of film corrugating device.
Figure 1:
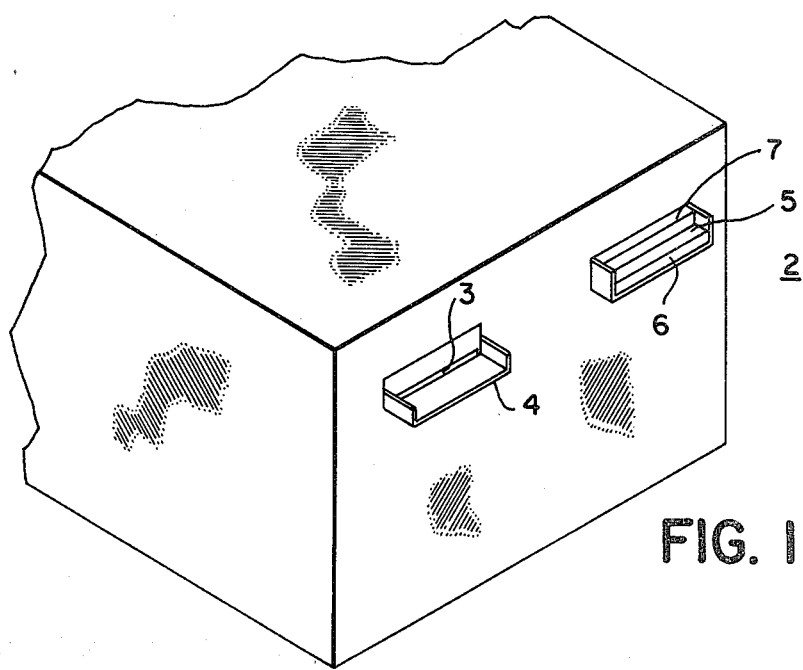
FIG. 1 is a fragmentary, perspective view of a film developing machine showing the externally visible portions of equipment used in practicing the present invention, specifically a device for imparting deformations or corrugations to the end of a film, and the input to the machine itself.

Referring now to the drawings, FIG. 1 shows the front face 1 of a film developing machine generally designated by the reference numeral 2. A film loading aperture 3 is provided in front face 1. Behind this aperture 3, but not visible in FIG. 1, is a pair of rollers (see rollers 16, 18, in FIG. 1a) defining a nip between them. Aperture 3 is for insertion of film to be processed in machine 2. Preferably a shelf 4 is positioned before aperture 3 to aid in guiding the film into the aperture.

Another aperture 5 is also provided, laterally displaced from aperture 3, in the front face 1 of machine 2. This aperture 5 is defined between two plastic blocks 6 and 7 which protrude the machine. Preferably the lower block 6 protrudes slightly more than upper block 7, thereby forming a shelf which aids in guiding the film into aperture 5.

Behind aperture 5, but not visible in FIG. 1, there is a corrugating device embodying the present invention.

One embodiment of this device, generally designated by reference numeral 10, is shown in FIGS. 1a through 9. This device is adapted to automatically and rapidly produce a plurality of deformations or corrugations 44 in the leading end 12 of the film strip 14. These corrugations prevent or discourage the curling of this leading end as it subsequently passes through the film processing machine such as indicated at 2 in FIG. 1, including the pair of intake rollers 16, 18, in FIG. 1a. The corrugating device 10 comprises generally a stationary lower platform formed by a table means 20, of suitable size to receive the leading strip end 12 thereon at the start of the corrugating process. If desired, the table means 20 may be provided laterally with a pair of transversely positioned upright flanges 22, 24 to act as guides as the leading end 12 of the strip 14 is inserted into the device 10. The table 20 is secured to a stationary base 26 in any known manner to prevent relative movement therebetween.

Figure 7:
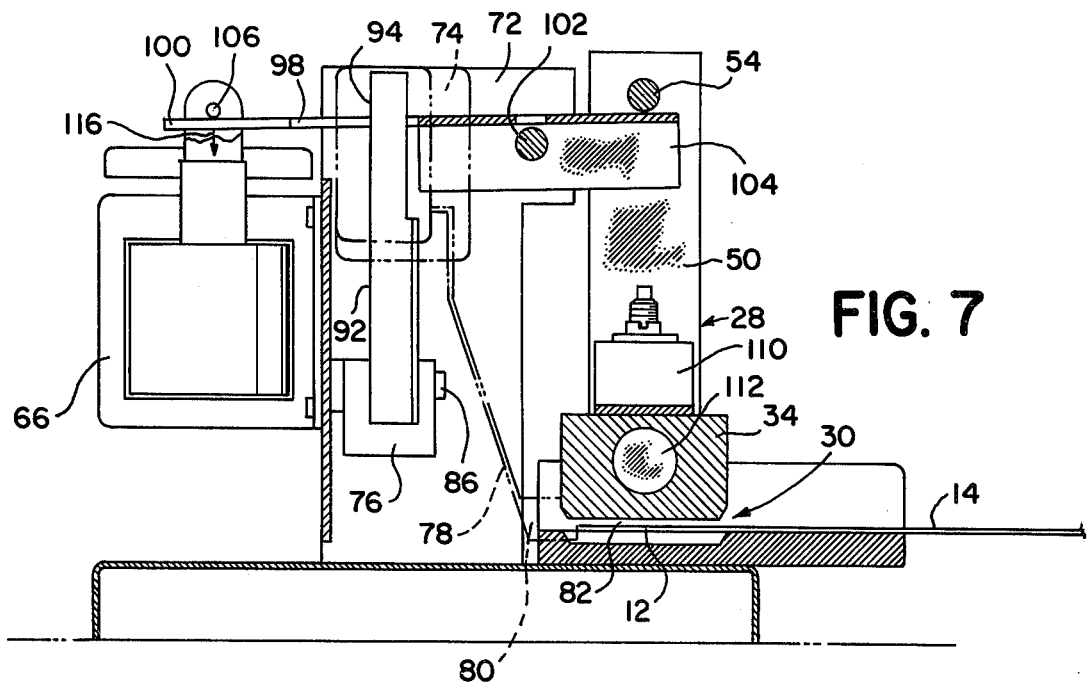
FIG. 7 is a cross-sectional view taken along line 7—7 of FIG. 4, looking in the direction of the arrows and showing the platens of the corrugating device in separated position.
Figure 8:
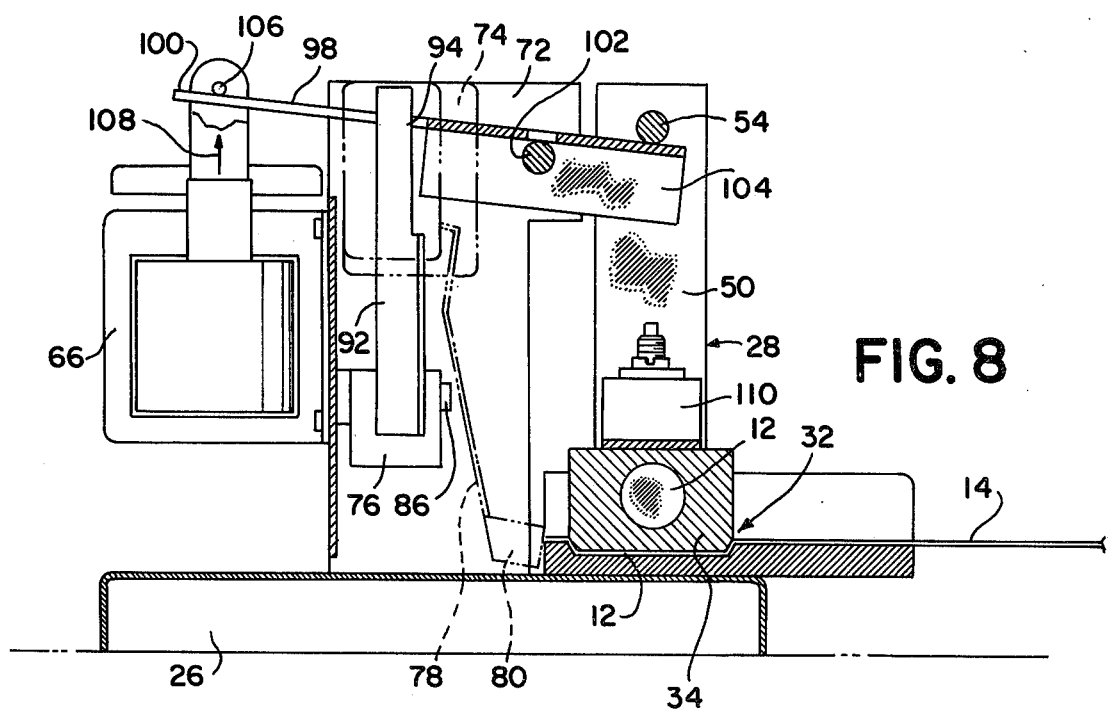
FIG. 8 is a cross-sectional view similar to FIG. 7, showing the platens in the corrugating position.

A moveable platen assembly 28 (FIG. 2) is reciprocal above the table 20 from an elevated position 30 as illustrated in FIG. 7 to a lower, or corrugating position 32 as illustrated in FIG. 8. The platen assembly 28 comprises generally a platen means 34 of metal or other suitable material, which is normally biased into corrugating engagement against table 20 by the platen springs 36, 38.

The platen may be machined, molded or otherwise conventionally formed with a plurality of parallel, longitudinally extended grooves 40 and ridges 42 to produce longitudinal deformations 44 in the leading edge 12 of the film 14 (FIG. 1a). In the embodiment illustrated, table 20 is equipped with a resilient pad 46 (FIG. 3) to aid in the strip corrugating process. Alternately, platen 34 could be provided with a smooth, strip contacting surface and the grooves and ridges could be machined or otherwise formed in the surface of table 20. As a second alternative construction, grooves and ridges could be fabricated both in table 20 and in the bottom of platen 34 to cooperatively interact in the strip end deforming or corrugating process.

A pair of vertical supports 48, 50 mount upon the top 52 of the platen 34 and carry upwardly therebetwen a platen bar 54, parallel to and above the platen 34. Each end 56, 58 of the platen bar 54 extends tranversely outwardly through a respective vertical support 48, 50 a distance sufficient to provide an attachment for one end of one of the platen springs 36, 38. The other ends of the platen springs 36, 38 connect respectively to one of the table flanges 22, 24. Strap extensions 60, 62 which securely affix to a flange 22 or 24 may be employed to secure the lower end of the springs 36, 38 to the table 20 if so desired. Thus, the platen 34 is free to move vertically between the left and right table flanges 22, 24 and the springs 36, 38 act to continousouly bias the platen 34 toward the table 20.

Immediately rearwardly of the platen assembly 28 is positioned the microswitch assembly 64 (FIG. 2) which functions with the first and second electromagnet means 68, 66 to automatically raise and lower the platen 34 in response to the presence of the leading end 12 of the strip 14. A timer switch assembly 70 functions in conjuction with the microswitch assembly 64 to time the operation of the first and second electromagnets 68, 66 to thereby automatically lower and raise the platen 34 from the corrugating position 32 as illustrated in FIG. 8 to the elevated position 30 as illustrated in FIG. 7 in the manner hereinafter more fully set forth. The microswitch assembly 64 comprises essentially a bracket 72 upon which is mounted a microswitch 74, a pivotal block 76, and the first and second electromagnets 68, 66.

The microswitch 74 comprises a depending arm 78 which terminates downwardly in a foot 80 near the bottom of the bracket 72. The foot 80 is positioned to partially obstruct the clearance space 82 defined between the bottom of the platen 34 and the top of the table 20 when the platen is in the elevated position 32. Thus, when the leading end 12 of film strip 14 is introduced into the corrugating device 10 through the space 82 defined between the platen and the table 20, its leading edge will contact the foot 80 of the microswitch arm 78. Inward urging of the leading end 12 in the direction indicated by the arrow 84 (FIG. 1a) will sufficiently depress the arm 78 to close the contact (not shown) of the microswitch 74. The microswitch 74 is wired to control the operation of the first electromagnet 68 which is then momentarily energized.

Figure 2:
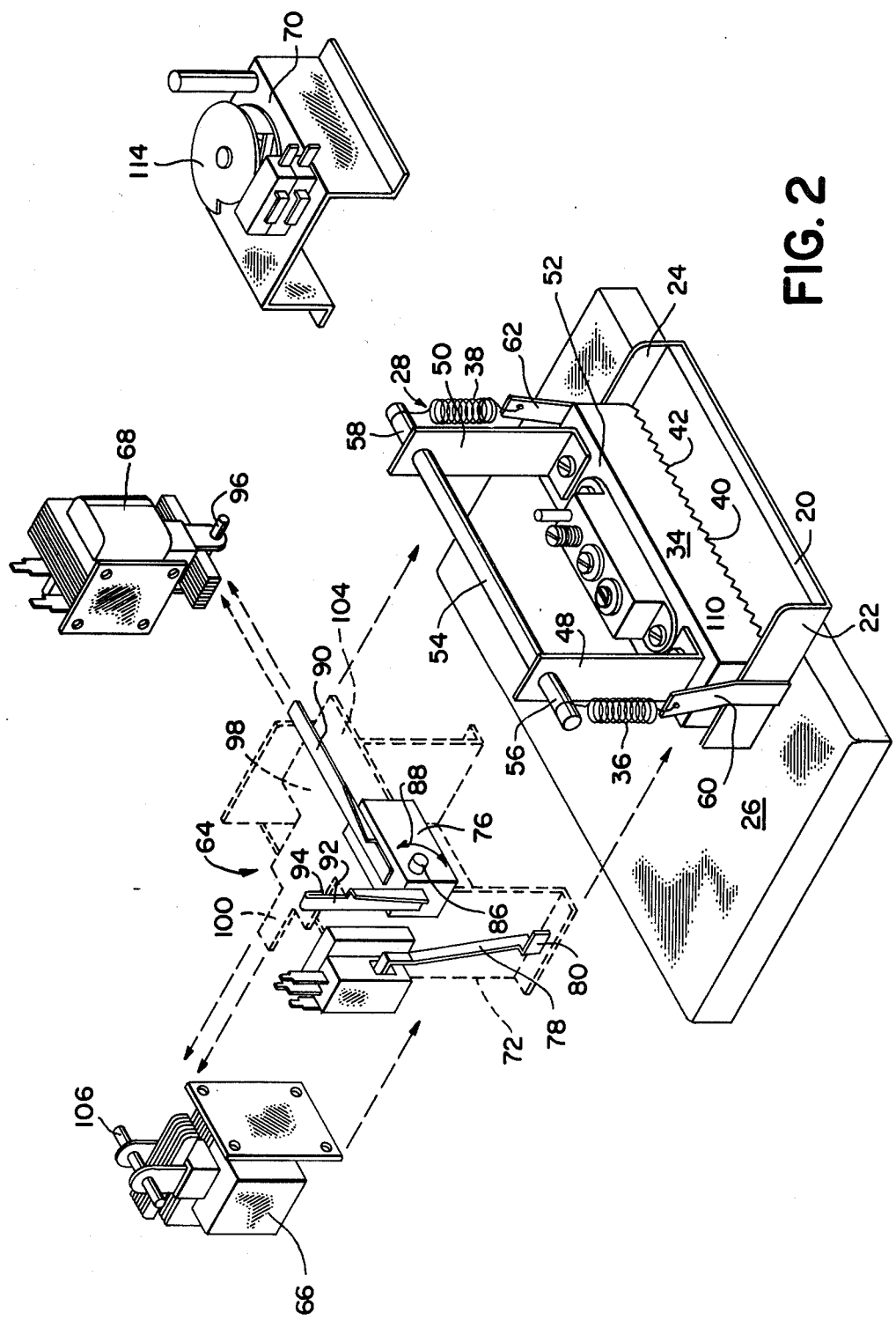
Figure 3:
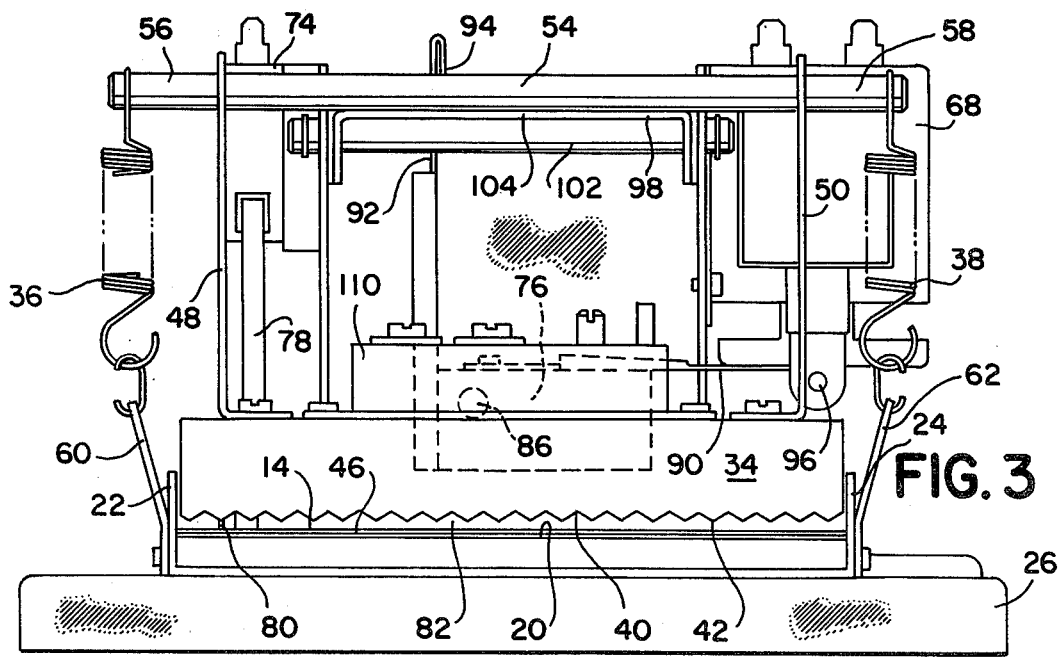
FIG. 3 is a further enlarged, front elevational view of the corrugating device.
Figure 5:
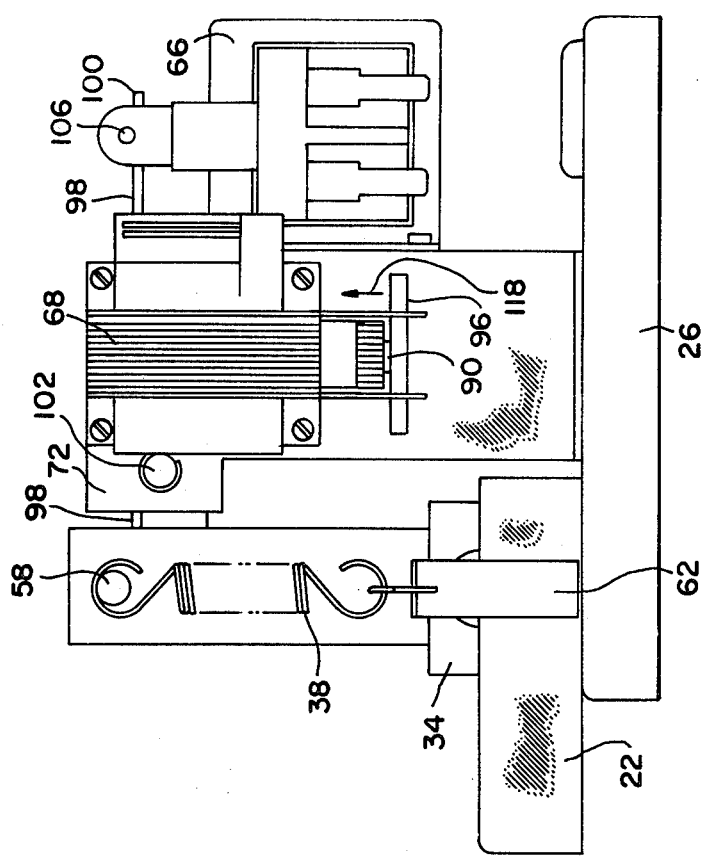
FIG. 5 is a left side elevational view of the corrugating device.
Figure 6:
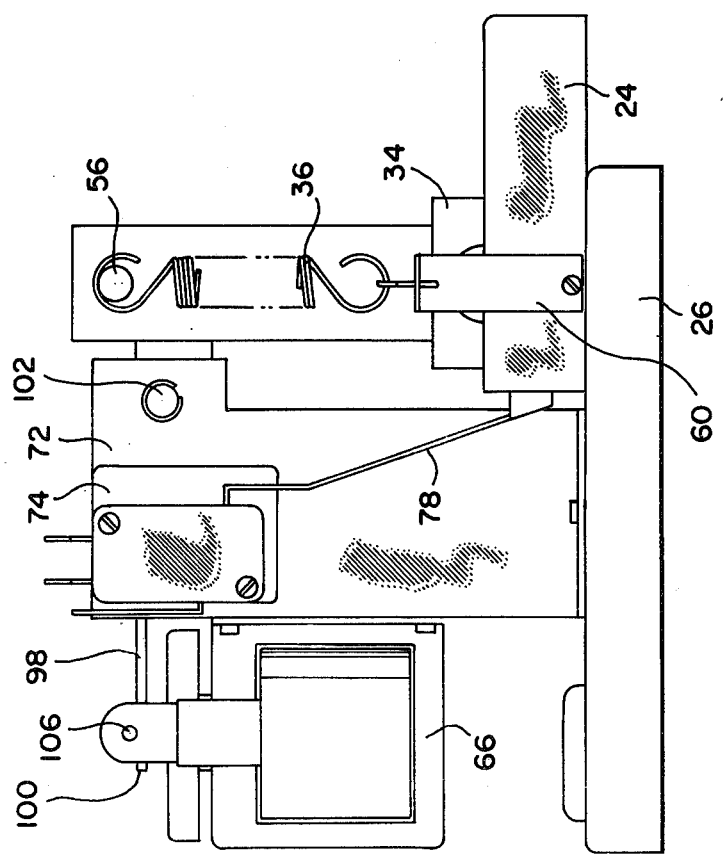
FIG. 6 is a right side elevational view.

As best seen in FIGS. 2 and 3, the block 76 is pivotally mounted in the bracket 72 and has pivotal movement about the pivot pin 86 in the direction indicated by the double headed arrow 88. A generally horiaontal pivotal arm 90 extends from the pivotal block 76 and terminates in a position to be acted on upon energization of the first electromagnet 68. A detent arm 92 projects generally vertically from the pivotal block 76 at right angles to the pivotal arm 90 and is upwardly formed to provide a detent 94. The detent 94 engages upon and holds the platen lever against the bias of the platen springs 36, 38 as hereinafter more fully set forth.

As best seen in FIG. 3, the pivotal arm 90 is engaged by the cradle pin 96 of the first electromagnet 68. Upon energization of the electromagnet 68 upon function of the microswitch 74, the cradle pin 96 is urged upwardly. The upward movement of the cradle pin 96 pulls the engaged pivotal arm 90 upwardly to thereby cause the pivotal block 76 to pivot in a counterclockwise direction about the pivot pin 86. Pivotal movement of the block 76 causes similar pivotal movement of the affixed detent arm 92 also in a counterclockwise direction. The counterclockwise movement of the detent arm 92 causes the detent 94 to disengage from its contact with the platen lever 98. The springs 36, 38 then immediately act to pull the platen 34 towards the table 20.

Figure 4:
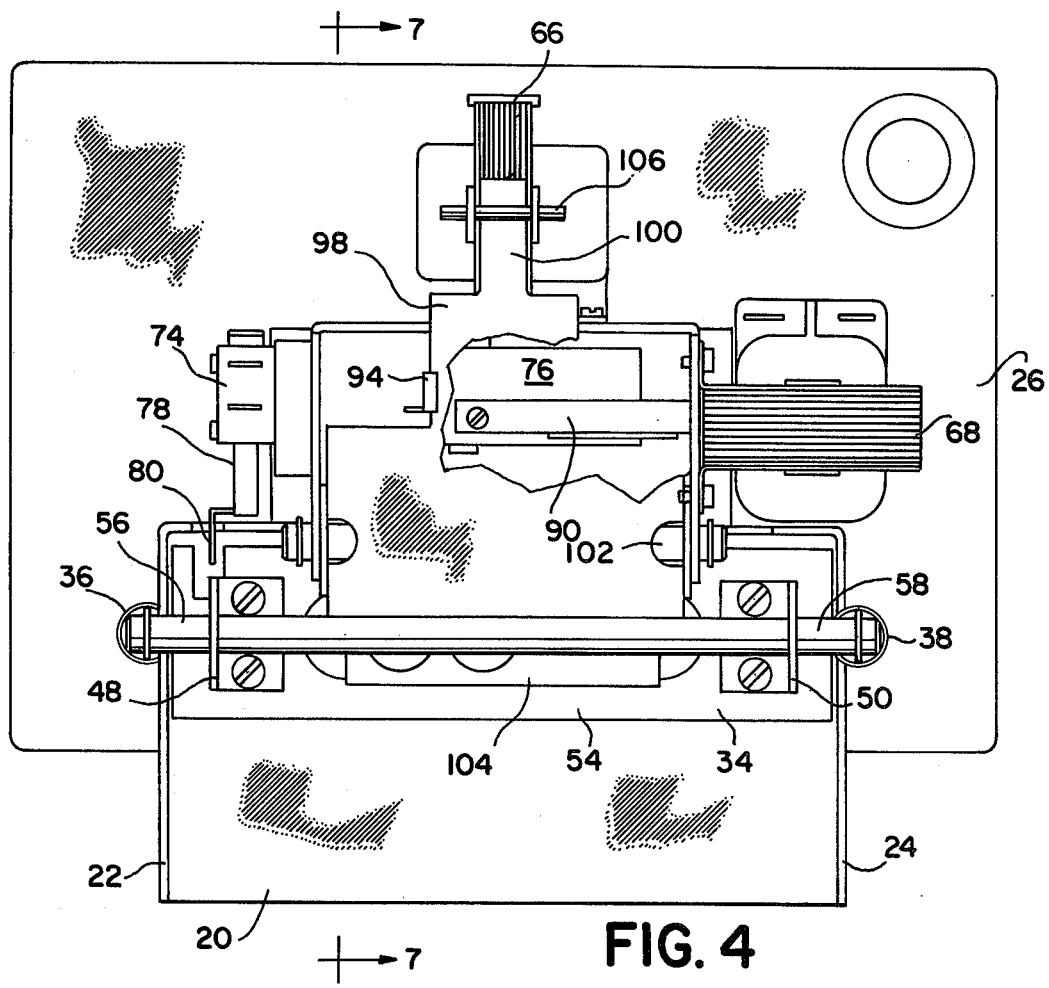
FIG. 4 is a top plan of the corrugating device, wherein portions have been partially broken away to expose details of interior construction.

As illustrated in FIGS. 4, 7 and 8, a platen lever means 98 is generally horizontally arranged and is pivotal about transverse pivot pin 102, which pin is rigidly secured in the bracket 72. The forward end 104 of the platen lever 98 extends beneath the platen bar 54, and by lever action serves to lift the platen assembly 28 as in FIG. 7 to the elevated position 30 to create the clear space 82 for admitting the leading end 12 of the strip 14 piror to corrugating. As illustrated in FIG. 8, when the platen lever 98 is allowed to pivot about the transverse pivot pin 102 in a clockwise direction, the springs 36, 38 act to pull the platen assembly 28 downwardly to the corrugating position 32 to thereby impress a plurality of deformations 44 in the leading end 12 of the strip 14.

Referring now to FIGS. 7 and 8, it will be seen that the platen lever 98 terminates rearwardly in a finger 100 which is engaged by the cradle pin 106 of the second electromagnet 66. Activation of the second electromagnet 66 will pull the cradle pin 106 downwardly in the direction of the arrow 116 to thereby pivot the platen lever 98 in a counterclockwise direction as viewed in FIG. 7 about the transverse pivot pin 102. The pivoting of the platen lever 98 to the horizontal position as illustrated in FIG. 7 causes the leading end portion 104 of the lever 98 to urge upwardly the platen assembly 28 relative to the table 20 by imposing upwardly directed forces on the platen bar 54. Deenergization of the second electromagnet 66 releases the cradle pin 106 to move upwardly away from the electromagnet 66 in the direction of the arrow 108. Upon deenergization of the second electromagnet 66, the platen springs 36, 38 function to bias the platen assembly 28 downwardly to the corrugating position 32 as illustrated in FIG. 8.

The geometry of the platen lever system is best seen in FIGS. 7 and 8 wherein the distance from the transverse pivot pin 102 to the rearward end of the finger 100 is considerably greater than the distance between the pivot pin 102 and the leading edge portion 104 of the platen lever 98. Thus great mechanical advantage is built into the system to facilitate operation of the second electromagnet 66 against the bias of the springs 36, 38.

Platen 34 is equipped with a suitable electric or other type of heater shown generally in the form of a conventional electrical connector block 110 and a known integral heating element 112 (see FIGS. 7 and 8). A timer switch assembly 70 of known design, including a timer cam 114 is employed to time the operation of the device including the timed cycle of operation of the first and second electromagnets 68, 66.

In operation, in the initial position illustrated in FIG. 7, the electrical circuitry of the device normally energizes the second electromagnet 66 to pull the cradle pin 106 downwardly in the direction of the arrow 116. As hereinbefore set forth, energization of the second electromagnet 66 pivots the platen lever 98 about the transverse pivot pin 102 to elevate the platen assembly 28, thereby defining a space 82 between the platen 34 and the platen table 20 (FIGS. 3 and 7). In this position, the spring bias of the detent arm 92 causes the detent 94 to engage a portion of the one end of the platen lever 98 to hold the platen lever in horizontal position, as illustrated in FIG. 7. With the platen 34 thus elevated, the leading end 12 of film strip 14 can be inserted into the space 82 by urging the leading end 12 inwardly beneath the platen 34. The leading end 12 contacts the foot 80 of the microswitch arm 78 to depress the arm 78 and thus close the contacts of the microswitch 74. The closing of the microswitch 74 functions the electrical circuit to initiate operation of the timer switch assembly 70 and to energize the first electromagnet 68 for a short, timed interval.

Energization of the first electromagnet 68 pulls the cradle pin 97 upwardly in the direction of the arrow 118 (FIG. 5) to thereby pivot the pivotal block 76 in a counterclockwise direction about the pivot pin 86. The counterclockwise pivotal movement of the block 76 causes similar pivotal movement of the block affixed detent arm 92 to thereby release the detent 94 from the engagement with the end of the platen lever 98. Release of the detent arm 94 from the platen lever 98 allows the platen springs 36, 38 to bias the platen lever 98 in a clockwise direction about the transverse pivot pin 102 to pull the platen assembly 28 to the corrugating position 32 as illustrated in FIG. 8.

The timer cam 114 functions through its cycle of operation for a predetermined period of time during the corrugating cycle and then functions the second electromagnet 66 to pull its cradle pin 106 downwardly in the direction of the arrow 116 as illustrated in FIG. 7. The downward movement of the cradle pin 106 pulls on the platen lever finger 100 to urge the platen lever 98 in a counterclockwise direction about the traverse fulcrum bar 102 as viewed in FIG. 7 to thereby elevate the platen assembly 28 to the elevated position 30. When the platen assembly 28 has been pulled to the elevated position 30, the detent 94 of the detent arm 92 again automatically engages the edge of the platen lever 98 to retain the platen assembly 28 in its elevated position 30. See FIGS. 3 and 7.

During the timed cycle, the device 10 functions to impress permanent deformations or corrugations 44 in the leading end 12 of the film strip 14. When the platen assembly 28 is again raised to the elevated position 30, the strip 12 can be withdrawn from the device 10 through the space 82. The strip can then be moved laterally of otherwise to the nip of input rollers 16, 18 of the film developing mahcine 2. After withdrawal of the fully deformed or corrugated leading end 12, another film strip 14 can be inserted into the device 10, wherein the foot 80 is again contacted and the arm 78 is depressed to repeat the timed cycle of operation.

The heating means is preferably energized well in advance of the insertion of a particular film strip 14 into the device, long enough in advance that the platens can have stabilized at the desired temperature. The voltage of the electric heater is appropriately chosen for that purpose. When a plurality of film strips is to be processed through machine 2 in succession, the heater is preferably left energized throughout the period so that the desired temperature will be maintained. A thermostat control may also be included in the heater circuit to maintain the desired temperature.

This temperature is one which will cause the film strip to soften while the platen is exerting pressure upon it, thereby assisting in the desired deformation of the strip. However, this temperature should be below that which will cause the strip to become tacky during its period of compression.

The film strip 14, after treatment in device 10, preferably has corrugations which deviate in both directions (up and down) from the plane of the original, untreated strip. The corrugations which are produced tend to be somewhat irregular. Some may extend all the way to the leading edge of the strip, but others may not. The height of different corrugations may also vary. Likewise, individual corrugations are not necessarily perfectly straight, either laterally with respect to the film strip, or up and down.

The over-all width of the original film strip will typically be substantially preserved in its corrugated position. This is believed to be attributable to the heating applied, which enables the film strip to stretch laterally while the corrugations are being formed, thereby preserving the initial overall width.

A second embodiment of this invention is illustrated in FIGS. 9 through 15, to which reference may now be had.

To the extent practical, elements of this embodiment are designated by the same reference numerals as the analogous elements of the embodiment of FIGS. 1a through 8, but with the suffix "a" added to indicate that the analogy is one of function rather than of structural detail.

The corrugating device shown in these figures is generally designated by reference numeral 10a. It includes lower and upper guide bars 6a and 7a, defining between them a slot 5a. In a typical practical application, device 10a would be mounted behind the front panel 1 of a film processing machine 2 such as illustrated in FIG. 1. In that case, bars 6a and 7a of device 10a would protrude from that machine front panel in a manner analogous to elements 6 and 7 of FIG. 1.

Behind bars 6a and 7a there is positioned a stationary lower platen defined by a table 20a with upstanding lateral end portions 22a and 24a. The upper surface of table 20a is preferably provided with corrugations, as especially visible in FIG. 12. Above table 20a, there is an upper platen 28a, whose bottom surface, facing table 20a, is matingly corrugated. Platen 28a is attached to a stirrup-shaped support plate 200. At protruding end portions 56a and 58a of support plate 200 there are attached the upper ends of springs 36a and 38a, respectively. Passing through apertures in end portions 56a and 58a, there are bent ends of stabilizer bar 201, whose extreme ends protrude through apertures in mounting plate 202 to which elements 6a, 7a and 20a are all rigidly attached. The bottom ends of springs 36a and 38a are attached to table 20a at ears 60a and 62a, respectively. Mounting plate 202 has an aperture 203, above which is positioned the actuating member 204 of a microswitch 205 which is also mounted on plate 202.

Figure 11:
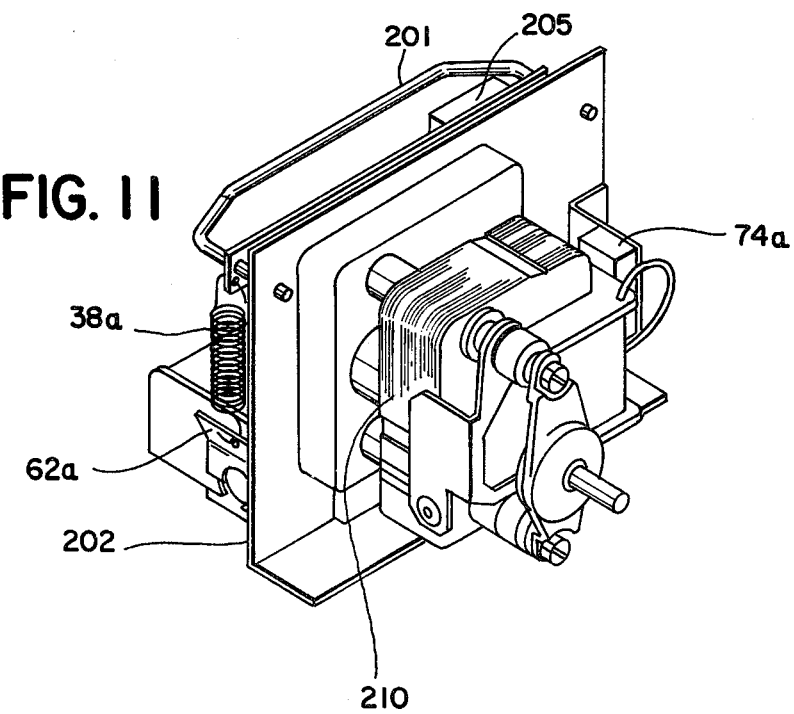
FIG. 11 is a rear perspective view of the same device as shown in FIG. 10.

On the reverse side of plate 202, which is best visible in FIG. 11, there is mounted an electric motor assembly 210. There is also mounted a microswitch unit 74a having dependent actuating lever 78a whose foot 80a extends through to the side of mounting plate 202 which is visible in FIG. 12, for example.

Rotatably attached to motor 210 is a circular disc 220 having at one point on its circumference a notch 221 adapted to receive switch actuator 204 when that notch is brought into alignment with this actuator.

Protruding from disc 220 is cylinder 222, which is eccentrically positioned with respect to disc 220, but revolves in conjunction with the disc. Preferably cylinder 222 is so positioned that its most eccentric position is circumferentially close to notch 221 in disc 220.

The alignment between plate 200 and cylinder 222, in a direction axially of the cylinder, is such that the arcuate edge 230 of the arc-shaped opening 231 within plate 200 rides on the surface of the cylinder whenever the rotation of disc 220 carries the cylinder 222 into the uppermost portion of its eccentric path. This is the condition illustrated in FIG. 10. In that condition, cylinder 222 through engagement of edge 230, lifts up plate 200 and with it platen 28a. This platen is thereby raised out of engagement with the table 20a. This disengaged relationship is visible in FIG. 14. In this condition the end portion of a film strip 14 can be inserted into slot 5a and into the gap between elements 20a and 28a or, alternative, withdrawn in the opposite direction from gap and slot.

Figure 15:
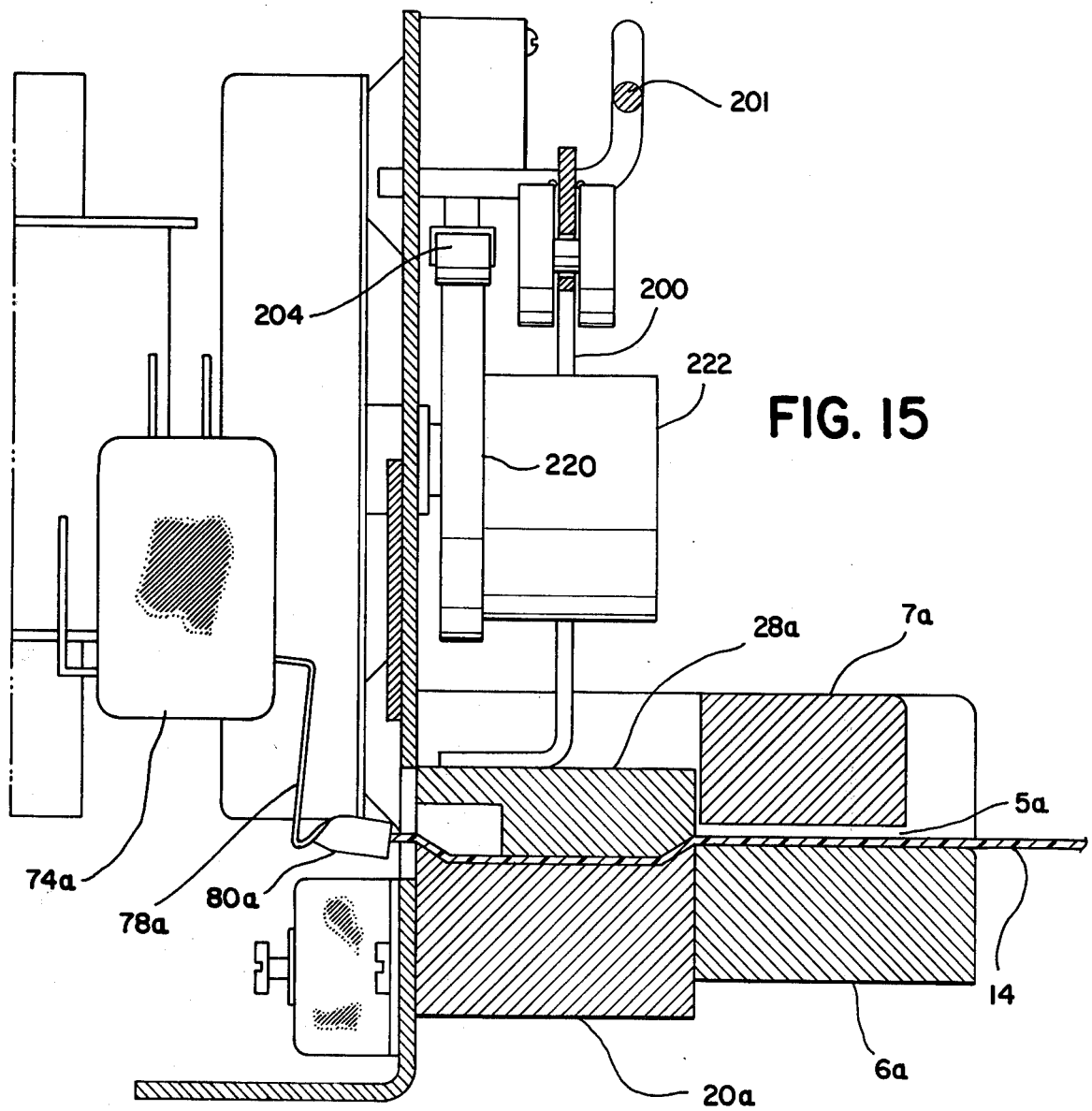
FIG. 15 is a cross-sectional view taken also along line 14—14 of FIG. 10, but showing the platens in corrugating position.

On the other hand, when rotation of disc 220 carries cylinder 222 into the lower-most portion of its eccentric path, then it no longer lifts up plate 200, but is preferably completely out of engagement with edge 230 of that plate. This relationship is visible in FIG. 13. In this condition, springs 36a and 38a, which exert a steady contracting force, function to urge platen 28a toward engagement with table 20a. This condition is shown in FIG. 15, whose elements 20a and 38a are shown separated only by film strip 14. Corrugations are imparted to this film by the confronting faces of elements 20a and 38a, under the combined influence of pressure exerted by these elements and heat supplied through one or both platen members, e.g. in the manner described with reference to the embodiment of FIGS. 1a through 8.

Rotation of disc 220, as necessary to cycle the device 10a between the two conditions described above, is provided by motor 210, which is controlled as follows.

Figure 13:
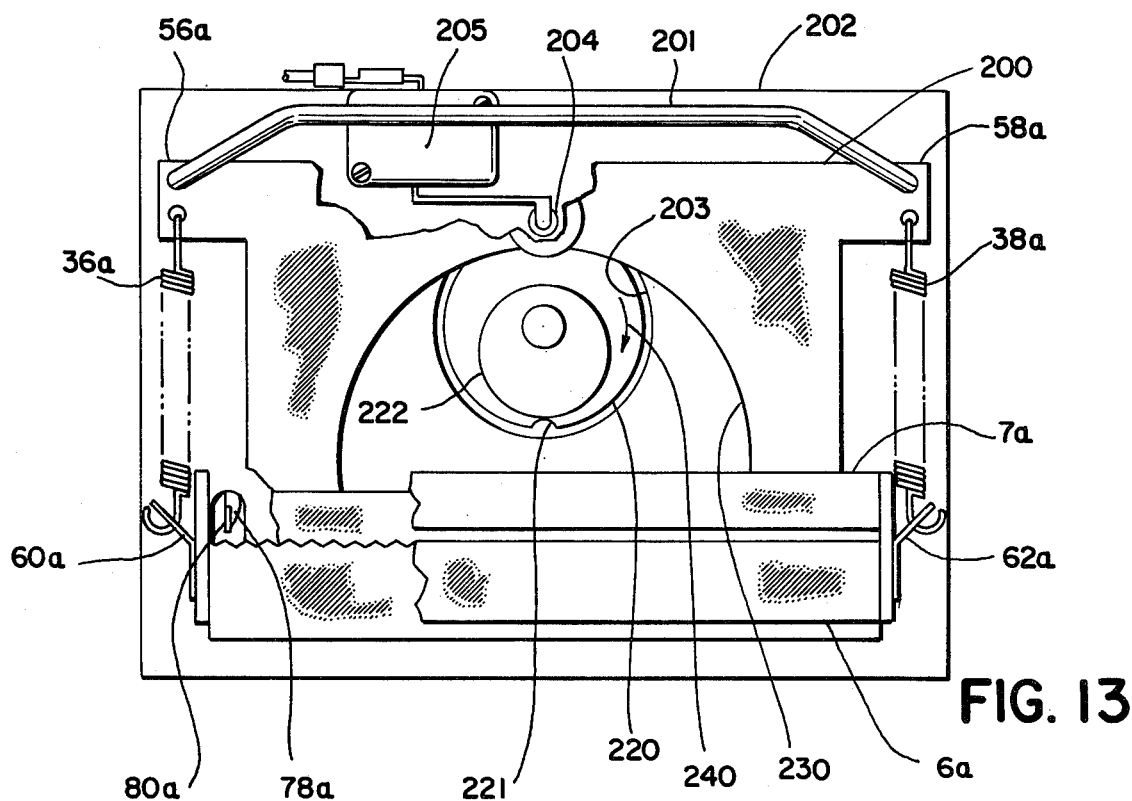
FIG. 13 is a front elevation, with portions broken away, of the embodiment of FIG. 10.
Figure 10:
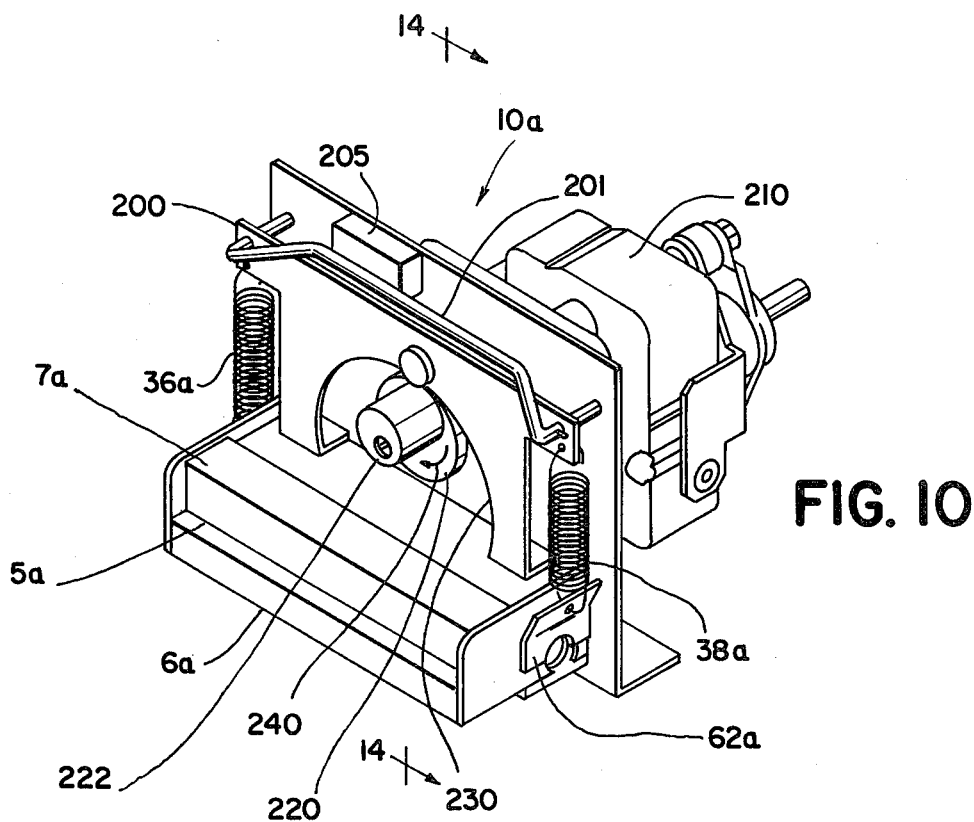
FIG. 10 is a perspective view of another specific embodiment of the film corrugating device according to the present invention.
Figure 12:
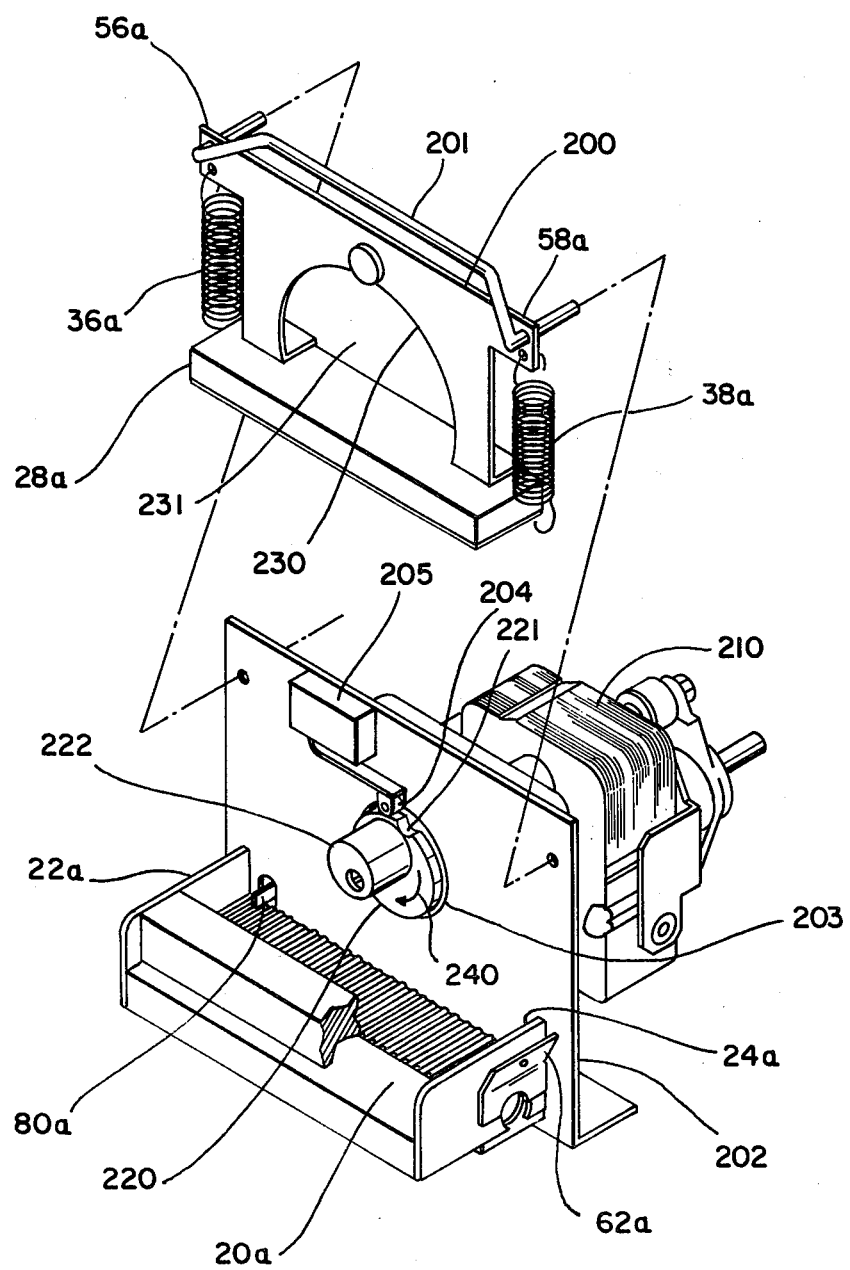
FIG. 12 is an exploded view of the embodiment of FIG. 10.

Let is be assumed that motor 210, when engaged, rotates disc 220 in the direction indicated by arrow 240 in FIGS. 10, 12 and 13. This direction will be referred to as clockwise. Let it further be assumed that this motor is stopped, and disc 220 is therefore also stopped in the position shown in FIG. 12, i.e. with the actuator 204 for microswitch 205 resting on the outer periphery of disc 220, counterclockwise just beyond notch 221. At that stage, the platen 38a is lifted up away from table 20a, as previously discussed. If a film 14 is then inserted into the gap so formed (FIG. 14) the leading edge of that film will abut against foot 80a and push that foot and its attached lever 78a rearwardly. This movement triggers microswitch 74a, which initiates rotation of motor 210 and consequent rotation of disc 220 as well as cylinder 222 atttached thereto. As this rotation takes place, platen 38a is gradually lowered under the influence of springs 36a and 38a until film strip 14 is compressed between it and table 20a (FIG. 15) as also previously discussed. As rotation continues, cylinder 222 will eventually reengage curved edge 230 of support plate 200 and lift up platen 38a again, out of engagement with film strip 14.

This rotation continues until notch 221 in disc 220 reaches the position of switch actuator 204. At that time, actuator 204 (which had been riding on the periphery of disc 220) drops into the notch 221 and this movement triggers microswitch 205, which stops motor 210.

Figure 14:
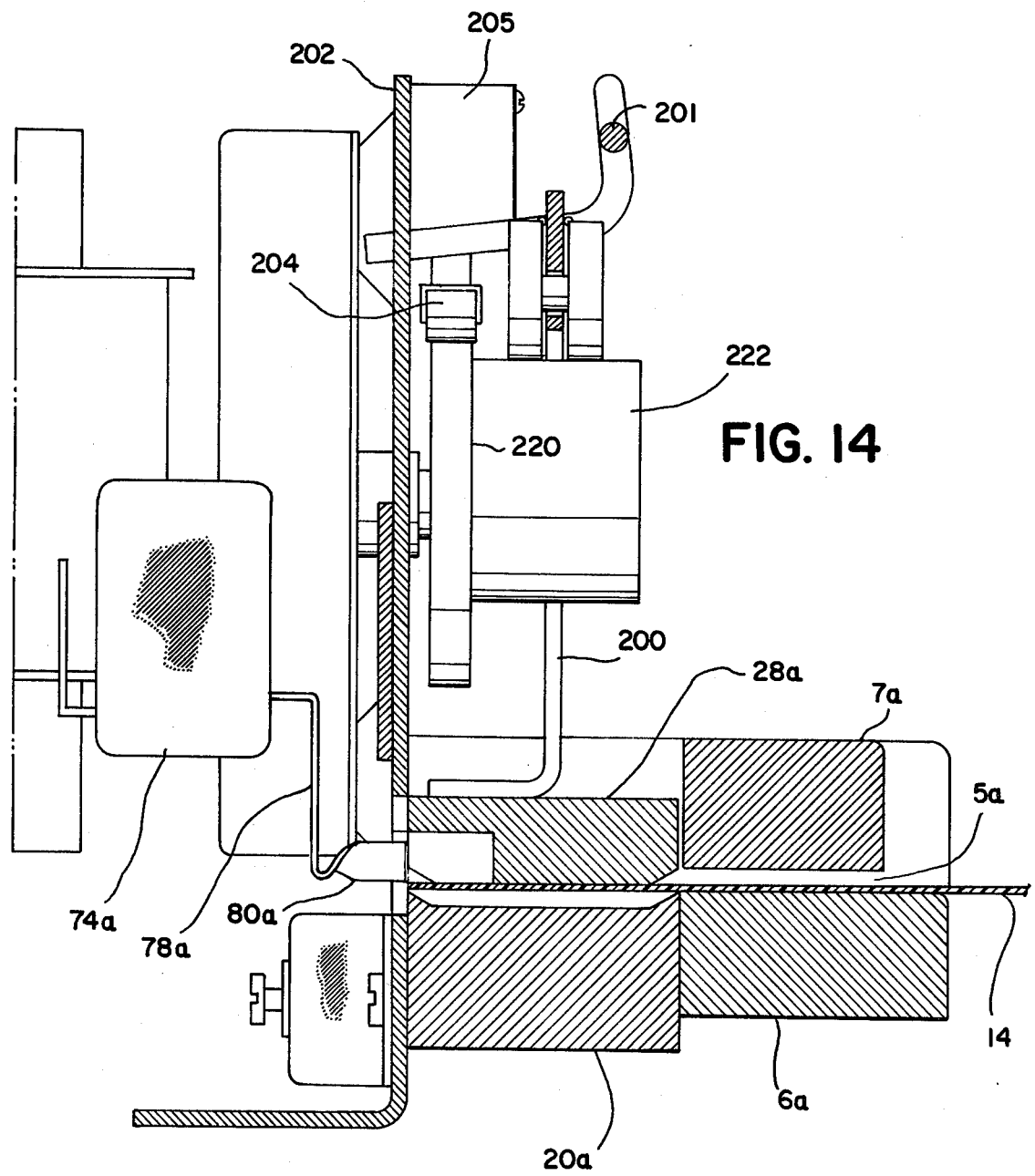
FIG. 14 is a cross-sectional view taken along line 14—14 of FIG. 10, showing the platens of the device in separated position.

The film strip 14 may then be withdrawn from the device, having had imparted to it the desired corrugations from the faces of platen 38a and table 20a. Such withdrawal of the strip releases the lever 78a and attached foot 80a, which then return to their forward positions (FIG. 14). This movement also triggers switch 74a which starts motor 210 again. After rotation disc 220 through only a small fraction of a circle, switch actuator 204 will have emerged from notch 221 and will again have reached the outer circular periphery of the disc. This movement again triggers microswitch 205 which once again stops motor 210.

The cycle has now been completed and the device is at rest, ready to receive another film strip 14 for corrugating.

It will be noted that for each one of switches 74a and 205 consecutive acutating movements in opposite directions produce the same effect on motor 210. For example, rearward movement of lever 78a turns on the motor, and so does the next consecutive forward movement. Similarly, downward movement of actuator 204 (into notch 221) stops the motor, and the next consecutive upward movement (out of notch 221) again stops it. This is achieved by appropriately wiring the switches 74a and 205 to each other and to motor 210, as shown in FIG. 9.

Electric power is supplied from a conventional source of such power 300 which may, for example, produce alternating current at 24 volts. A step-up transformer 301 is used to raise this voltage to 115 volts.

Across the 115 volt output of transformer 301 there is connected an electric heater elements 302 in series with a thermostat 303. The necessary connections are made through terminals 310, 311 and 312. A terminal 313 provides additional inter-connections discussed below. Heater 302 and thermostat 303 cooperate to maintain the platen structure of device 10a at the desired operating temperature. Switches 205 and 74a are connected as shown. The movable element of switch 205 is mechanically actuated between its two possible positions by actuator 204 riding on the outer periphery of disc 220 as diagrammatically indicated in FIG. 9. The movable element of switch 74a is actuated by lever 78a as also diagramatically indicated in FIG. 9.

Figure 9:
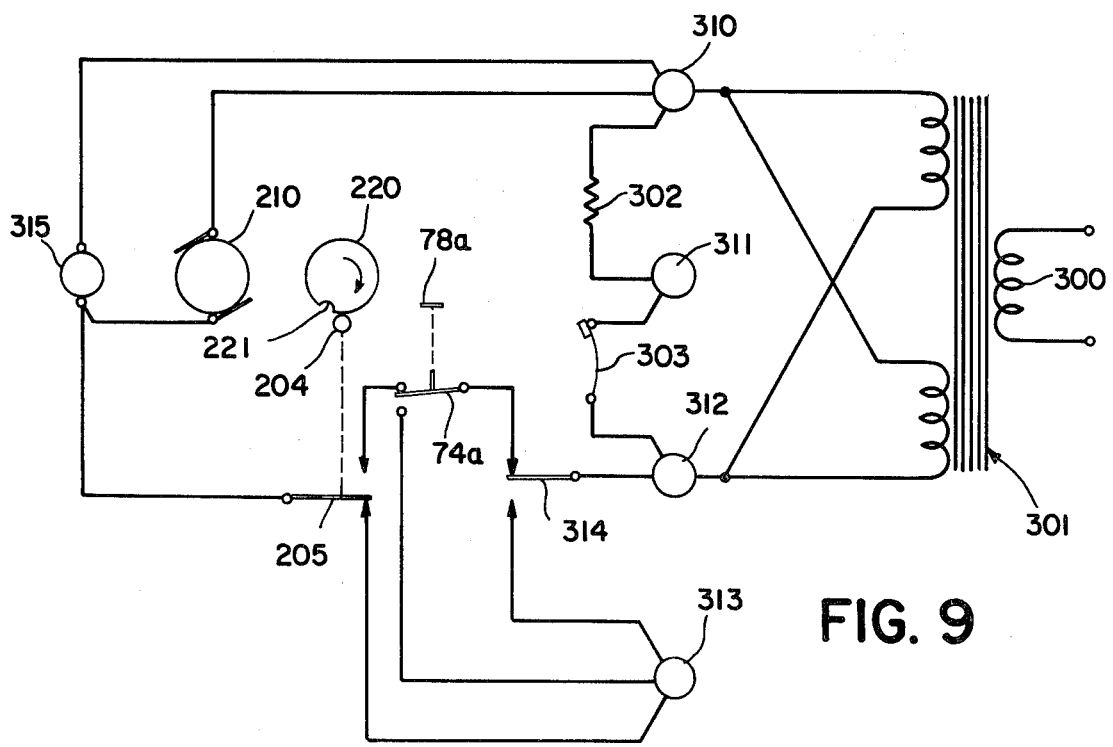
FIG. 9 is a schematic diagram of the electrical connections within the corrugating device of FIGS. 10 to 15.

Motor 210 is connected between the movable element of switch 205 and terminal 310 and switches 205 and 74a are connected together through terminal 313 as shown in FIG. 9. An additional switch 314 is permanently connected in the position illustrated in FIG. 9 and may, if desired, actually be omitted.

Also a bell or buzzer 315 may be connected in parallel with motor 210 if desired.

The switching arrangement of FIG. 9 is shown in that position which prevails while the device 10a is awaiting insertion of a film strip 14. As previously discussed, the actuator 204 is then on the circular periphery of disc 220, counter-clockwise just beyond notch 221. In that condition the movable element of switch 205 is pressed down, interrupting the electrical connection to the movable element of switch 74a which, at the same time, is up by virtue of the released position of lever 78a.

As soon as a film strip 14 is inserted into the device, lever 78a is moved rearward. This corresponds to a depression of the movable element of switch 74a in FIG. 9, thereby closing the electrical circuit from terminal 310 through motor 210 to terminal 312 and thereby energizing motor 210 with the full 115 volt operating voltage. This causes rotation of disc 220 clockwise as shown in FIG. 9. If a buzzer 315 is provided it also energizes the buzzer which thereupon sounds for as long as motor 210 continues to rotate.

During such rotation of motor 210 and until notch 221 reaches the position of actuator 204, the device 10a will go through the cycle in which the platen compresses the film strip 14 and imparts corrugations thereto. This will then be followed by a movement in which the pressure is relieved and the slot within the device reopened. When actuator 204 drops into notch 221, the movable element of switch 205 contacts the upper stationary contact, thereby interrupting the circuit to motor 210, which then stops. When the film strip 14 is then withdrawn and the pressure which it exerts on lever 78a is thereby relieved, that lever returns forward and the movable arm of switch 74a also returns to its upper stationary contact. This again completes the circuit energizing motor 210 which resumes rotation. However, this rotation only continues until actuator 204 has emerged from notch 221 and returned to its initial position on the circular circumference of disc 220. At that point, the movable contact of switch 205 again returns to its lower position and the motor energizing circuit is interrupted once more. At this point the device is back in its initial position ready for the insertion of another filmstrip 14.

The foregoing devices constitute preferred embodiments of the invention. However, it will be understood that other embodiments of such devices may be utilized, if desired.

Instead of utilizing a motor actuating a lever to lift the platen up away from the table, as in the embodiment of FIGS. 1 through 8, the motor-operated lever may be used to press these elements together for corrugating, while other means, e.g. springs, are relied upon to separate these elements so as to permit insertion and withdrawal of film strips.

Instead of a motor operating a lever, hydraulic pressure may be used to apply or to relieve the corrugating pressure between platen and table. Also magnetism may be employed, e.g. in the form of a table of magnetic material and a platen which can be electrically magnetized to produce intermittent attraction between table and platen.

A device embodying the present invention is also particularly suitable for the auxiliary purpose of applying identifying indicia to the film. These typically take the form of adhesive labels with side-by-side pairs of matching numbers or letters. One member of each pair is applied to the container in which the film is stored and transported. The other is applied to the film itself so that it is easy to reunite each given film with its container of origin after processing in machine 2. In accordance with the present invention, this label is applied to the film strip before insertion in the corrugating device. The operation of that device then both mechanically and through applied heat firmly bonds the label to the film and greatly reduces the prospect of its being lost during processing in machine 2.

We claim:

1. A machine for deforming the end portion of a strip of flexible material, the machine having a first position in which it is open and capable of accepting the strip of film to be deformed, and a second position in which it is closed to deform the strip of film, the machine comprising:
   a pair of pressure platens, facing each other,
   mechanically powered means for continuously urging the platens toward each other during the period of time that the machine is in the first or the second position,
   means for overcoming the mechanically powered means, to maintain the platens separated when in the first position, and
   electrically powered means which, for a limited period, permits the uring of the mechanically powered means, to close the platens upon each other and upon the end portion of a strip of flexible material.

2. The machine of claim 1 wherein
   the means for maintaining the platens separated consumes no electrical power during its operation.

3. A machine for deforming the end portion of a strip of flexible material, the machine comprising:
   a pair of pressure platens, facing each other,
   mechanically powered means for continuously urging the platens toward each other,
   electrically powered means for overcoming during a limited period the urging of the mechanically powered means thereby to separate the platens and to form between them a slot for the insertion of the strip end portion,
   means for maintaining the platens separated after the end of said limited period, and
   means responsive to the insertion of the strip portion into the slot to disable the means for maintaining the platens separated and thereby to close the platens on the strip portion.

4. The machine of claim 3 further comprising
   means for delaying by a predetermined time interval the separating of the platens by the electrically powered means after the closing of the platens on the strip portion.

5. The machine of claim 1 further comprising
   means for heating the pressure platens.

6. The machine of claim 1 wherein
   the means for urging the platens toward each other includes a pair of springs under tension mounted between the platens.

7. The machine of claim 6 wherein
   the springs are mounted at opposite ends of the platens.

8. The machine of claim 3 wherein
   the electrically powered means is a solenoid-operated lever acting on one of the pressure platens.

9. The machine of claim 8 wherein
   the means for maintaining the platens separated is a mechanical latch engaging the lever after it has been operated by the solenoid.

10. The machine of claim 8 further comprising
    electrical timing means for delaying the operation of the solenoid after the insertion of the strip portion into the slot.

11. The machine of claim 10 wherein
    the separation disabling means is a second solenoid connected to release the lever from engagement by the latch.

12. The machine of claim 3 wherein
    the electrically powered means is a motor-driven cam acting on one of the pressure platens.

13. The machine of claim 12 wherein
    the cam is an eccentric wheel rotated by the motor.

14. The machine of claim 13 wherein
    the separation maintaining means comprises means for stopping the rotation of the wheel after rotating through a predetermined arc of a revolution.

15. The machine of claim 14 wherein
    the separation disabling means comprises means for causing the wheel to rotate through a different arc of a revolution.

16. In a photographic film strip developing machine which uses rollers to transport the film strip through the machine including input rollers defining a nip for receiving the film strip for transport through the macine, the machine comprising:
    an open slot accessible from the face of the machine for insertion of an end portion of the film strip to be developed,
    the slot being defined by a pair of platens facing each other, at least one platen having heating means and at least one having corrugations in its slot-defining surface;
    means responsive to insertion of the strip into the slot to close the platens upon the inserted strip;
    means for maintaining the platens closed upon the strip, and thereby maintaining the strip stationary between the closed platens, for a predetermined period of time sufficient to impress into the strip corrugations conforming to those in the platen surface; and
    means for reopening the slot at the end of the period, wherby the strip end can be withdrawn from the reopened slot and inserted into the nip of the input rollers.

17. A machine for deforming the end portion of a strip of flexible material, the machine comprising:
    a pair of pressure platens, facing each other,
    a pair of springs, mounted at opposite ends of the platens and attached to a force equalizer bar stretching between the ends of the platens, the springs being under tension and mounted between the platens to urge the platens toward each other,
    electrically powered means for overcoming during a limited period the urging of the mechanically powered means, thereby to separate the platens and to form between them a slot for the insertion of the strip end portion, and
    means for maintaining the platens separated after the end of said limited period.

18. The machine of claim 1 wherein the flexible material is a photographic film.

19. The machine of claim 18 wherein the end portion is a leading edge.

20. A machine for deforming the end portion of a strip of flexible material, the machine having a first position in which it is open and capable of accepting the strip of film to be deformed, and a second position in which it is closed to deform the strip of film, the machine comprising:
- a pair of pressure platens, facing each other,
- mechanically powered means for continuously urging the platens toward each other during the period of time when the machine is in the first position,
- means for overcoming the mechanically powered means, to maintain the platens separated when in the first position, and
- electrically powered means which, for a limited period, permits the urging of the mechanically powered means, to close the platens upon each other and upon the end portion of the strip of flexible material.

21. A machine for deforming the end portion of a strip of flexible material, the machine comprising:
- a pair of pressure platens, facing each other,
- mechanically powered means for continuously urging the platens toward each other,
- means for overcoming the mechanically powered means, to maintain the platens separated, and
- electrically powered means which, for a limited period, permits the urging of the mechanically powered means, to close the platens upon each other to an extent sufficient to deform the end portion of the strip of flexible material while also permitting the platens to remain separated at a distance sufficient to permit the remainder of the strip of film to extend outward from the closed platens,
- thereby forming a slot between the pair of platens into which may be inserted the end portion of a strip of material to be deformed.

* * * * *